United States Patent [19]
Pool et al.

[11] Patent Number: 5,207,131
[45] Date of Patent: May 4, 1993

[54] OIL FILTER REMOVAL TOOL

[75] Inventors: James L. Pool, Clarinda, Iowa; Woodson L. Stovall, Lincoln, Nebr.

[73] Assignee: Lisle Corporation, Clarinda, Iowa

[21] Appl. No.: 691,536

[22] Filed: Apr. 25, 1991

[51] Int. Cl.[5] .............................................. B25B 23/00
[52] U.S. Cl. .................................... 81/443; 81/446; 81/448
[58] Field of Search .................. 81/451, 452, 441–443, 81/446, 448–449

[56] References Cited

U.S. PATENT DOCUMENTS

| | | | |
|---|---|---|---|
| 148,629 | 3/1874 | Smith | 81/442 |
| 548,696 | 10/1895 | Carver | 81/76 |
| 570,933 | 11/1896 | Kleckner | 81/76 |
| 598,783 | 2/1898 | Holford | 81/76 |
| 3,296,900 | 1/1967 | Behnke | 81/448 |
| 4,335,632 | 6/1982 | Irwin et al. | 81/449 |

Primary Examiner—D. S. Meislin
Attorney, Agent, or Firm—Allegretti & Witcoff, Ltd.

[57] ABSTRACT

An oil filter removal tool for removing an oil filter contained within the oil pan of an internal combustion engine is disclosed. The tool has a pair of outwardly engaging jaws, a rotatable central socket drive element, means for connecting the outwardly engaging jaws to cooperatively engage the central socket drive element, and means for outwardly biasing the jaws. The outwardly engaging jaws each have a substantially semicircular outer wall which has means for engaging an oil pan filter cap. The outwardly engaging jaws each further have an inner wall which has a central polygonal surface and retaining means for retaining the central socket drive element within the jaws. The central socket drive element has an upper portion and a lower polygonal base which has a plurality of drive walls. Thus, a socket drive is receivable in the central socket drive element, the element thus being rotatable, the drive walls being operatively associated with the inner wall central polygonal surfaces of the jaws, the jaws being outwardly moveable, thereby permitting the jaws to engage an oil pan filter cap by rotation of the central socket drive element.

2 Claims, 2 Drawing Sheets

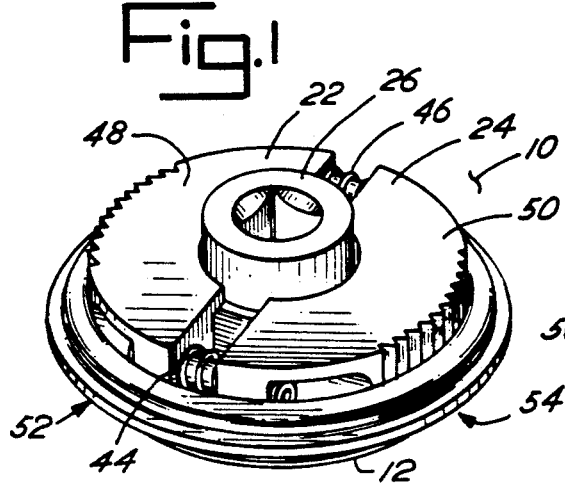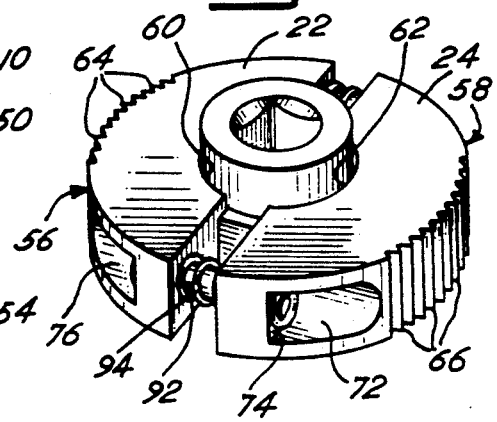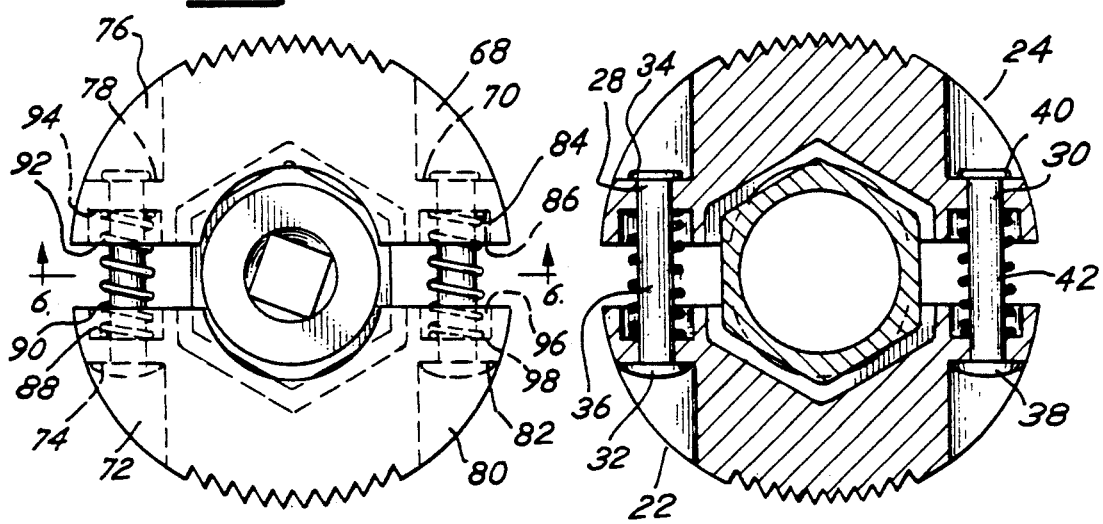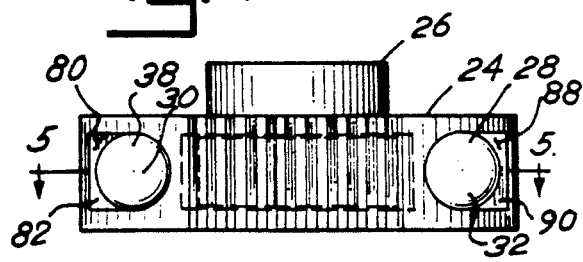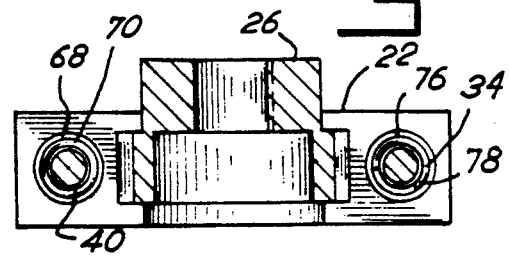

OIL FILTER REMOVAL TOOL

BACKGROUND OF THE INVENTION

In a principal aspect, the present invention relates to an improved oil filter removal tool for removing the oil filter from an internal combustion engine. Specifically, such a tool is designed for use on an oil filter that is located within the oil pan, and is useable on a multitude of internal combustion engines constructed by different manufacturers. Most commonly, such a tool is used in connection with the service and maintenance of certain automobiles manufactured by General Motors which contain the oil filter in the oil pan.

A particular problem associated with removing oil filters that are located within the oil pan from internal combustion engines, especially in automobiles, is that of working in tight spaces. In other words, to remove an oil filter from an automobile engine usually requires that a special tool be used to remove the oil filter, enabling the user to obtain torque on the oil filter cap to twist it off and remove it from the oil pan of the automobile engine.

A problem thus associated with oil filter removal tools that precede the present invention is that they are bulky and difficult to use in tight spaces. This problem has become particularly more acute as automobile engines become more sophisticated and more powerful, while the automobiles bodies into which these engines are placed become smaller and more compact. This makes for tighter engine compartments in which the automobile owner or mechanic must work.

An even more particular problem associated with the use of oil filter removal tools is that created by increasingly sophisticated engine design. Many engines today are constructed to operate at higher temperatures and pressure, and therefore require that the motor oil be changed more frequently. For example, the relatively recent trend toward diesel engines carries with it the increased need for oil changes, as these diesel engines operate at nearly three times the compression ratio of the more common Otto cycle engines, and, correspondingly, operate at higher temperatures, as well.

Moreover, an increasing number of automobiles today carry, as a power improvement apparatus, a turbine supercharger. These turbine superchargers, or "turbochargers", compress the ambient air by means of a turbine compressor which is driven by the exhaust of the engine. The turbocharger thus enables a greater amount of air and fuel to be forced into the internal combustion engine. Turbochargers are commonly employed on both gasoline and diesel engines. These apparatus, too, increase the operating pressure and temperature of the engine and consequently increase the frequency of oil changes.

Typically oil filters that are contained within the oil pan are changed by providing access to the oil pan through the lower portion of the automobile engine. Thus, the oil filter is reachable from underneath the car rather than from above it. This has become increasingly difficult, however, as many automobiles now offer much more sophisticated chassis and suspension systems. For example, the use of multiple shock absorbers per wheel, multiple anti-roll or anti-sway bars, four wheel independent suspension, and rack and pinion steering has created a multitude of parts located underneath the engine compartment through which it is very difficult to reach the engine itself. Moreover, there is an increasing trend toward front wheel and all wheel drive automobiles, in which the drive train also impairs access to the internal combustion engine from underneath the car.

Yet another problem in performing oil changes is encountered in connection with certain utility vehicles, such as four wheel drive pickups and carryalls, as well as some automobiles. More specifically, when protective plating is provided under the engine compartment to minimize damage from rocks, etc. striking the vehicle undercarriage, access to the oil pan is even more difficult.

To minimize these problems and provide an oil filter screw cap that can be removed from the oil pan without special tooling, General Motors has offered a screw cap having at its center a hexagonal nut head. This hexagonal shaped protrusion, embossed into the cap, is constructed and arranged to provide means for removing the cap by use of a standard socket or wrench. This solution to these problems is not satisfactory, however, as the hexagonal shaped protrusion typically is less than one inch in diameter and is driven to remove a screw cap having a thread pattern typically exceeding three inches in diameter. Thus, a great deal of torque is loaded onto the hexagonal protrusion, eventually rounding its corners to more circular dimensions.

Thus, an even more particular problem arises when the hexagonal protrusion is deformed. Insufficient torque can be applied to the protrusion to remove the screw cap, and hence, the screw cap cannot be removed.

Thus, a need has arisen for an oil filter removal tool that can outwardly engage the periphery of the screw cap, applying a force at a greater working diameter and effecting greater torque. Moreover, a need has arisen for an oil filter removal tool that will not deform any feature of the screw cap. Finally, the special needs created by all of the problems preexisting the development of the General Motors screw cap having a central hexagonal protrusion are still existent, and must be overcome by any successful oil filter removal tool to be developed.

In these aforementioned situations as well as others, the ability to change an oil filter located with the oil pan has become more complex. Removal of the filter can be frustrating and difficult, and is usually the most time consuming step in performing an oil change. This increased difficulty, in combination with the increasing frequency of oil changes, thus defines a long felt and unsolved need which has arisen for an oil filter removal tool that is compact and requires minimal operating room.

The present invention constitutes an improved oil filter removal tool for use with an internal combustion engine that seeks to overcome these problems, while at the same time providing a simple, easily constructed design that is readily adapted to a variety of automobiles having oil filters contained within the oil pan, and can address all of the aforementioned problems.

SUMMARY OF THE INVENTION

Briefly, the present invention comprises an improved oil filter removal tool for removing an oil filter from an internal combustion engine, and particularly from within the oil pan.

Thus, it is an object of the present invention to provide an improved oil filter removing tool that is compact in both its structure and usage and can be used on automobile engines, thereby facilitating the changing of oil filters thereon.

A further object of the present invention is to provide an improved oil filter removing tool that is simply designed and inexpensive to manufacture, maintain and use.

A further object of the present invention is to provide an improved oil filter removing tool that can accommodate a wide variety of automobiles having the oil filter contained within the oil pan, and thereby permit use on many different models of automobiles.

Still a further object of the present invention is to provide an improved oil filter removing tool that is biased so as to grip the oil filter screw cap when in place, thereby facilitating its use in cramped quarters.

Yet a further object of the present invention is to provide an improved oil filter removing tool that has a construction providing for a nearly parallel jaw action, thereby minimizing the space needed to effect its operation.

Still a further object of the present invention is to provide an improved oil filter removing tool that can grip the oil filter with substantially uniform force, thereby preventing the oil filter screw cap from being deformed during operation of the oil filter removal tool.

A further object of the present invention is to provide an improved oil filter removing tool that offers a wider range of operability due to its combination of compact size and ability to accommodate varied oil filters.

Yet a further object of the present invention is to provide an improved oil filter removing tool that is outwardly engaging and does not require a central, fixed-shape protrusion in the screw cap to effect its operation.

Still a further object of the present invention is to provide an improved oil filter removing tool that effects a turning force on an outer location, so as to permit a greater torque to be placed on the screw cap without overstressing any part of the screw cap.

These and other objects, advantages and features of the present invention will be apparent from the detailed description that follows.

BRIEF DESCRIPTION OF THE DRAWING

In the detailed description that follows, reference will be made to the drawing comprised of the following nine figures:

FIG. 1 is an upper, perspective view illustrating a preferred embodiment of the apparatus as it is seated for use on an automobile oil filter;

FIG. 2 is an upper, perspective view illustrating the preferred embodiment of FIG. 1;

FIG. 3 is a top plan view illustrating the preferred embodiment of FIG. 1 in a releasing position;

FIG. 4 is a side plan view of the preferred embodiment of FIG. 1;

FIG. 5 is a cutaway top plan view of the preferred embodiment of FIG. 1 as seen along the line 5—5 in FIG. 4;

FIG. 6 is a side plan view of the preferred embodiment of FIG. 1;

DETAILED DESCRIPTION OF THE DRAWING

Figure 7:
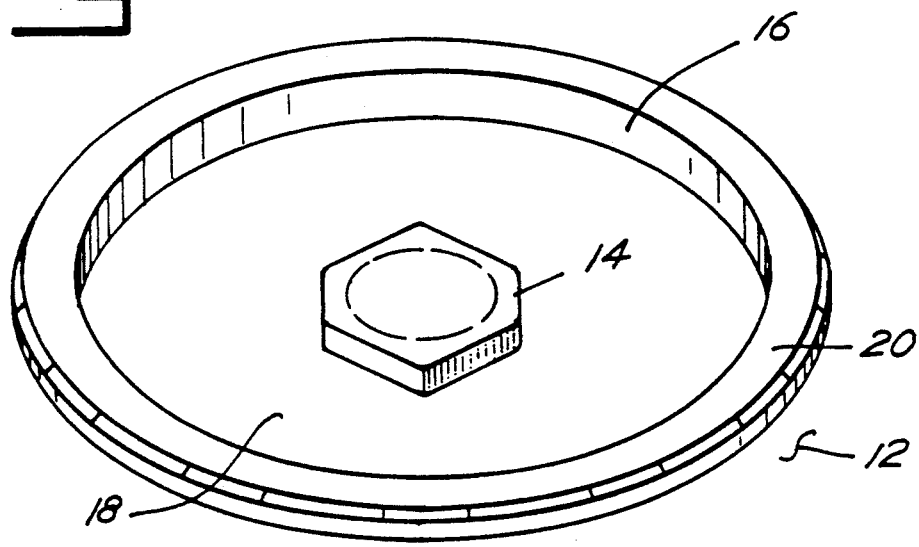
FIG. 7 is a top plan view of an oil pan filter cap for which the preferred embodiment of FIG. 1 was designed.

As shown in FIG. 1, a filter removal tool 10 is provided for removing an oil filter contained within the oil pan of an internal combustion engine. The filter removal tool 10 is designed for use with an oil pan filter cap 12, typically threaded to screw into an oil pan. Referring now to FIG. 7, such an oil pan filter cap 12 has in its center a cap hexagonal plug 14. Disposed about the outside of the cap 12 is a cap cylindrical wall 16. The cap generally has a cap outer face 18 and a cap outer periphery 20. The preferred embodiment of the filter removal tool 10 is therefore constructed for use with a oil pan filter cap 12 of this type.

Referring now again to FIG. 1, the filter removal tool 10 has a pair of outwardly engaging jaws 22, 24 and a rotatable central socket drive element 26. As shown in FIG. 5, the jaws 22, 24 are connected to one another by rivets 28, 30. The first rivet 28 has a rivet head 32, a rivet foot 34 and a rivet torso 36. The second rivet 30 also has a rivet head 38, a rivet foot 40 and a rivet torso 42. The rivets 28, 30 are thus constructed and arranged to provide means for interconnecting the outwardly engaging jaws 22, 24.

Referring now to FIG. 1, the outwardly engaging jaws 22, 24 are biased outward by outward biasing springs 44, 46. Thus, the biasing springs 44, 46 are disposed about the torsos 36, 42 of the rivets 28, 30 and provide means for outwardly biasing the jaws 22, 24.

Referring still to FIG. 1, the outwardly engaging jaws 22, 24 are identical. Thus, each of the jaws has a top face 48, 50 and a bottom face 52, 54 (not shown). As shown in FIG. 2, each of the jaws has a semi-circular outer wall 56, 58, an inner wall 60, 62 and a plurality of engaging teeth 64, 66 disposed about the semicircular outer walls 56, 58. The engaging teeth 64, 66 thus come in contact with the cap cylindrical wall 16 and provide means for engaging an oil pan filter cap 12 so as to facilitate removal thereof from an oil pan (not shown).

Referring now to FIGS. 3 and 5, the jaws 22, 24 are each provided with a left hand outer rivet aperture 68, 72 with corresponding aperture bases 70, 74. Likewise each jaw 22, 24 has a right hand outer rivet aperture 76, 80 with corresponding aperture bases 78, 82. The jaws 22, 24 have left hand inner rivet apertures 84, 88 with corresponding aperture bases 86, 90. Likewise, the jaws 22, 24 have right hand inner rivet apertures 92, 96 with corresponding aperture bases 94, 98.

Figure 8:
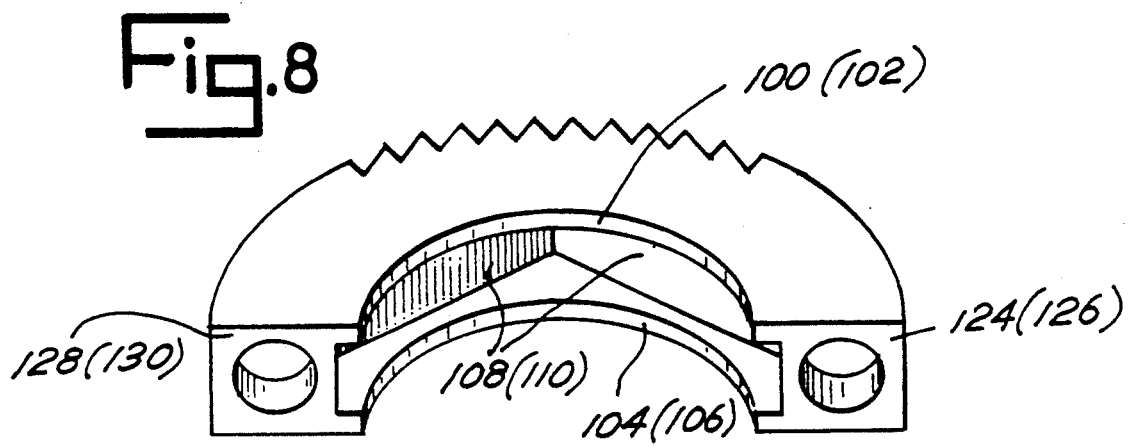
FIG. 8 is an upper, perspective view of a portion of the preferred embodiment of FIG. 1.

Referring now to FIG. 8, the first jaw 22 is shown. As noted above, in the preferred embodiment, the second jaw 24 is identical to the first jaw 22, and hence is not separately drawn. Each of the jaws 22, 24 has an inner wall upper semi-circular retaining ridge 100, 102. Each of the jaws 22, 24 also has an inner wall lower semi-circular retaining ridge 104, 106. The jaws 22, 24 have inner wall central polygonal surfaces 108, 110 interposed between the upper retaining ridge 100, 102 and the lower retaining ridges 104, 106. The upper and lower ridges 100, 102 and 104, 106 therefore provide retaining means for retaining the central socket drive element 26 within the jaws 22, 24.

Figure 9:
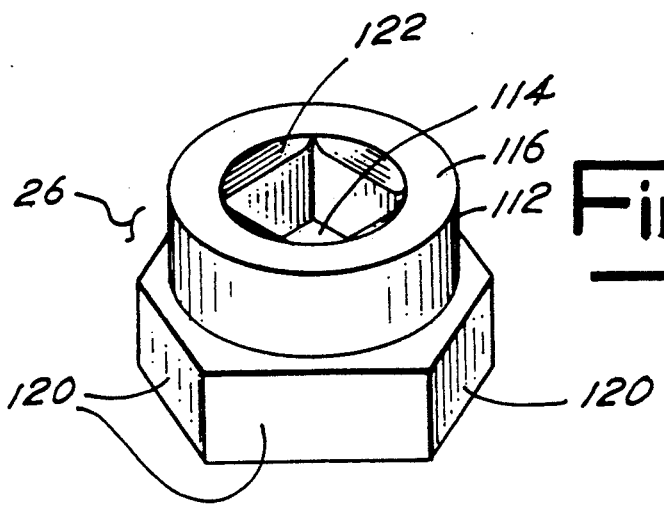
FIG. 9 is an upper, perspective view of a portion of the preferred embodiment of FIG. 1.

Referring now to FIG. 9, the central socket drive element 26 has an upper cylindrical portion 112, a socket drive receiving aperture 114, a top face 116 and a lower polygonal base 118. The socket drive receiving aperture 114 is disposed in the center of the top face 116 and provides means for receiving a socket drive. The lower hexagonal base 118 is provided with drive walls 120. The socket drive receiving aperture 114 is provided with a round socket countersink bevel 122 to facilitate easy installation and removal of a socket drive. The socket drive receiving aperture 114 thus defines means for receiving a socket drive.

Referring now to FIG. 8, the jaws 22, 24 are each substantially semi-circular and have extending across the diameter portion thereof a left hand jaw facing 124, 126 and a right hand jaw facing 128, 130.

The inner wall central polygonal surfaces 108, 110 are hexagonal as shown in the preferred embodiment. These hexagonal surfaces 108, 110 thus define an outer regular hexagon having a diameter Do. The lower polygonal base 118 and the drive walls 120 of the central socket drive element 112 are also hexagonal as shown in the preferred embodiment. This hexagonal base 118 and its hexagongl drive walls 120 thus define an inner regular hexagon having a diameter Di. As shown, the ratio of Do to Di is greater than 1,000 and less than 1.155.

The rivets 28, 30 hold the jaws 22, 24 together and facilitate containing the socket drive element 26 within the jaws 22, 24. Thus, as shown in FIGS. 3 and 5, the filter removal tool 10 is assembled as follows. The central socket drive element 26 is positioned between the jaws 22, 24. The jaws 22, 24 are positioned together such that the left hand jaw facing 124 of the first jaw 22 is proximate to the right hand jaw facing 128 of the second jaw 24, and the second left hand jaw facing 126 of the first jaw 22 is proximate to the second right hand jaw facing 130 of the second jaw 24. The socket element 26 is thus maintained in raised relation to the bottom faces 52, 54 of the jaws 22, 24 such that the lower hexagonal base 118 is positioned within the central hexagonal surfaces 108, 110 of the jaws 22, 24. Thus, it is apparent that the lower hexagonal base 118 has a height that is less than the height of the central hexagonal surfaces 108, 110 (as measured in the socket drive axial direction). The lower base 118 of the socket drive element 26 rests on the lower semi-circular retaining ridges 104, 106 of the jaws 22, 24. The upper semi-circular retaining ridges 100, 102 of the jaws 22, 24 prevent movement of the central drive 26 upward.

The rivet torsos 36, 42 are placed in the rivet apertures 72, 80 of the first jaw 22. The rivet heads 32, 38 thus come in contact with the rivet aperture bases 74, 82 of the outer rivet apertures 72, 80 of the first jaw 22. The springs 44, 46 are disposed about the torsos 36, 42 of the rivets. When assembled, the spring ends of the springs 36, 42 are adjacent the inner aperture bases 86, 90, 94, 98 of the inner apertures 84, 88, 92, 96 of the jaws 22, 24. The springs thus provide biasing to further maintain the jaws in spaced apart relation.

The rivet torsos 36, 42 extend through the first jaw 22 and into the inner rivet apertures 88, 96 of the second jaw 24. The torsos 36, 42 extend through these rivet apertures 88, 96 terminating in the outer rivet apertures 72, 80 of the second jaw 24. The rivets are then permanently put into place by creating the rivet feet 34, 40 which are now adjacent the outer rivet aperture bases 74, 82 of the outer rivet apertures 72, 80 of the second jaw 24. Thus, the rivets 28, 30 hold the two jaws 22, 24 in spaced apart relation, and secure the central socket drive element 26 within the jaws 22, 24.

The oil removal tool 10 is operated by inserting a socket drive (not shown) into the socket drive receiving aperture 114. By rotating the rotatable central socket drive element 26 in either direction, the drive walls 120 are moved into contact with the inner wall hexagonal surfaces 108, 110 of the jaws 22, 24. As the central socket drive element 126 is further rotated, the drive walls 120 push the jaws 22, 24 apart. The outward movement of the jaws 22, 24 thereby presses the engaging teeth 64, 66 against the cylindrical wall 16 of the oil pan filter cap 12. The cap 12 can thereby be removed by continuous turning of the socket drive in one direction, and installed by continuous turning in the other direction.

The invention therefore provides an oil filter removal tool for removing an oil filter contained within the oil pan of an internal combustion engine. The foregoing detailed description described the preferred embodiment of the invention. It is clear, however, that the preferred embodiment may be variously modified. Therefore, to particularly point out and distinctly claim the subject matter regarded as invention, following claims concluded the specification.

What is claimed is:

1. An oil filter removal tool for removing an oil filter contained within the oil pan of an internal combustion engine, the tool comprising, in combination:

a pair of outwardly engaging jaws, a rotatable central socket drive element, means for connecting the outwardly engaging jaws to cooperatively engage the central socket drive element, and means for outwardly biasing the jaws;

the outwardly engaging jaws each having a substantially semicircular outer wall, the outer wall having means for engaging an oil pan filter cap so as to facilitate removal thereof from an oil pan, the outwardly engaging jaws each further having an inner wall having a central polygonal surface and retaining means for retaining the central socket drive element within the jaws;

the central socket drive element having an upper portion and a lower polygonal base, the upper portion having means for receiving a socket drive, the lower polygonal base having a plurality of drive walls;

whereby a socket drive is receivable into the central socket drive element, the element being thus rotatable, the drive walls being operatively associated with the inner wall central polygonal surfaces of the jaws, the jaws being outwardly moveable, thereby permitting the jaws to engage an oil pan filter cap by rotation of the central socket drive element;

whereby the central polygonal surfaces of the outwardly biased jaws are hexagonal, thereby defining an outer regular hexagon having a diameter Do, and the lower polygonal base of the central socket drive element is hexagonal, the lower polygonal base thereby having six drive walls and defining an inner regular hexagon having a diameter Di;

whereby the means for interconnecting the outwardly engaging jaws comprises a first rivet and a second rivet, each of said rivets comprising a head, a foot and a torso, the outwardly engaging jaws each having a pair of outer rivet apertures having outer rivet aperture bases, the rivets being received in the rivet apertures so that the rivet heads and the rivet feet are in contact with the outer rivet aperture bases.

2. An oil filter removal tool as shown in claim 1, the jaws each having a pair of inner rivet apertures, the inner rivet apertures each having inner rivet aperture bases;

the means for outwardly biasing the jaws comprising a pair of biasing springs, the springs being disposed about the rivet torsos and being in contact with the inner rivet aperture bases so as to apply an outward spring force against the inner rivet aperture bases, thereby biasing the jaws outward.

* * * * *